(No Model.)
G. A. F. STREUBER.
FILTER.
No. 417,399. Patented Dec. 17, 1889.
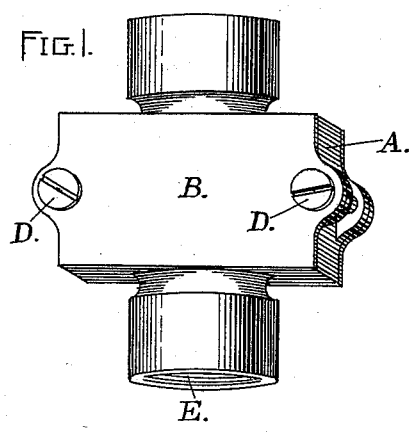
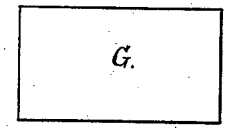
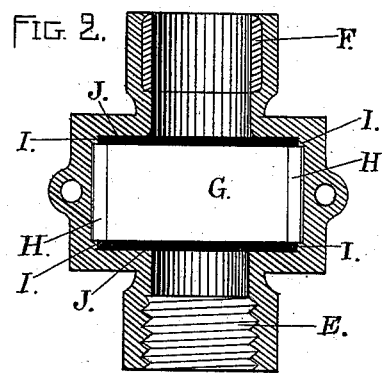
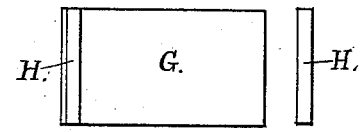
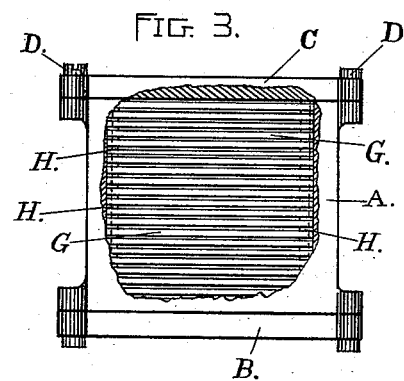
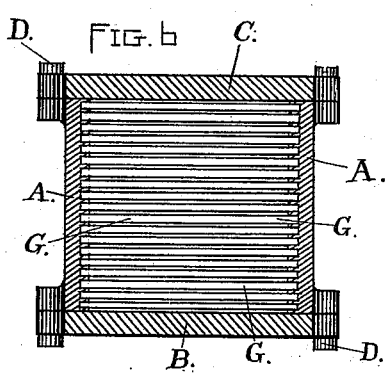
Attest,
John H. Redstone
K. B. Redstone
Inventor,
Gustav Adolph Franz Streuber

UNITED STATES PATENT OFFICE.

GUSTAV ADOLPH FRANZ STREUBER, OF OAKLAND, ASSIGNOR TO HIMSELF, AND DAVID RUTHERFORD, OF SAN FRANCISCO, CALIFORNIA.

FILTER.

SPECIFICATION forming part of Letters Patent No. 417,399, dated December 17, 1889.

Application filed December 15, 1888. Serial No. 293,683. (No model.)

*To all whom it may concern:*

Be it known that I, GUSTAV ADOLPH FRANZ STREUBER, a citizen of the United States, residing in the city of Oakland, in the county of Alameda and State of California, have invented a new and useful Improvement in Water and other Liquid Filters, of which the following is a specification.

My invention relates to improvements in water-filters, which will be understood by reference to the accompanying drawings and the letters referring thereto.

Figure 1 is a perspective view of a filter embodying my improvement. Fig. 2 is a horizontal central sectional view. Fig. 3 is a side elevation with the threaded coupling portion broken away. Fig. 4 is a plan view of one of the glass plates removed. Fig. 5 is a similar view of one of the glass plates and two pieces of tin-foil for separating the same, and Fig. 6 is a vertical sectional view taken in a plane at right angles to Fig. 2.

A represents the outside case of the filter; B and C, the sides or doors of the filter; D, the attaching-screws. E represents the inside screw of the filter-connecting coupling-pipe; F, the smooth connecting pipe-coupling; G, the glass strip which forms the filling of the filter; H, the tin-foil strips for spacing the glass strips.

I represents the ledges or bearings for the glass strips, which form the water-spaces above and below the filtering material, so as to allow a free flow of water to the same.

The following is the construction of my improved filter. I form the outer case A and the covers or heads B and C of any suitable material, such as metallic castings or other material generally employed in that class of construction. I employ strips of glass G of sufficient breadth to give the required strength, and I generally space them with tin-foil of a thickness to correspond with fineness of the water-passages through which the water is to percolate in filtering. I generally cut the tin-foil strips about one-eighth of an inch in width, and place them at the ends of the glass strips, and between each as they are piled in, to fill the space. I attach either by a screw E or washer F, as may be required. The filter is reversed for cleansing in the same manner as other filters are reversed.

The filter, when required for use upon a large supply of water, is constructed by placing a number of cells or nests, all arranged in a sash or frame large enough to allow the required flow of water, in which case the current of water is reversed for cleansing the filter by any well-known device. In some cases I place the strips of glass in grooves formed for the purpose of receiving them and holding them in the position shown.

Having thus described my invention, what I claim, and desire to secure by Letters Patent, is—

1. In liquid-filters, the combination, with a filter case or frame, of glass plates arranged approximately parallel within the case and between the inlet and outlet thereof, and tin-foil strips arranged between the plates at their edges, for separating the same, substantially as specified.

2. The combination, with a filter, of glass plates arranged therein between the inlet and outlet, and having spaces between them for the passage of the water, substantially as specified.

GUSTAV ADOLPH FRANZ STREUBER.

Witnesses:
JOHN H. REDSTONE,
K. B. REDSTONE.